United States Patent
Peschke

[11] B 3,924,825
[45] Dec. 9, 1975

[54] PLASTIC BEARING

[75] Inventor: Reiner Peschke, Ottobrunn, Germany

[73] Assignee: Messerschmitt-Bolkow-Blohm GmbH, Munich, Germany

[22] Filed: Sept. 8, 1972

[21] Appl. No.: 287,270

[44] Published under the Trial Voluntary Protest Program on January 28, 1975 as document no. B 287,270.

[30] Foreign Application Priority Data

Sept. 14, 1971 Germany.......................... 2145771

[52] U.S. Cl..................................... 244/46; 308/76
[51] Int. Cl.².......................................... B64C 3/38
[58] Field of Search............ 244/43, 46; 308/76, 77, 308/238

[56] References Cited
UNITED STATES PATENTS

| 2,352,206 | 6/1944 | Kendall | 308/77 |
| 2,443,403 | 6/1948 | Smith | 308/76 |
| 2,451,124 | 10/1948 | Smith | 308/77 |
| 2,928,698 | 3/1960 | Feighofen | 308/77 |
| 3,279,721 | 10/1966 | Dethman | 308/238 |

FOREIGN PATENTS OR APPLICATIONS

| 598,040 | 6/1934 | Germany | 308/77 |

Primary Examiner—Trygve M. Blix
Assistant Examiner—Jesus D. Sotelo
Attorney, Agent, or Firm—Woodhams, Blanchard and Flynn

[57] ABSTRACT

Heating device for a plastic bearing. For swing-wing aircraft operating at low temperatures there is provided heating device by which temperature control is maintained over a plastic bearing having interfitted surfaces. Electric heating elements may be provided in one of the bearing components or alternatively passageways are provided therethrough and connected to a source of hot engine exhaust gases. An insulative layer may also be provided if desired for controlling the flow of heat from the source thereof.

11 Claims, 5 Drawing Figures

PLASTIC BEARING

FIELD OF THE INVENTION

The invention relates to a plastic bearing which is subjected to wide temperature variations, and particularly to low temperatures, comprising a device for heating the bearing.

BACKGROUND OF THE INVENTION

Self-lubricating bearings with surfaces consisting of plastic often contain as bearing material a cloth which consists at least partially of polytetrafluoroethylene with an elastic backing and a support body which consists of a thermoplastic material. Such bearings have both a self-lubricating characteristic and also a good static and dynamic load carrying capacity without excessive wear. However, they have the disadvantage that the friction coefficient of the bearing material increases substantially at very low temperatures which can cause bearing damage.

It is known to hold the temperatures of bearings for rotating shafts of machines at a degree appropriate to the operation of the bearing, by either dissipating the frictional heat created in the bearing by cooling or, however, if the bearing is to be operated at low ambient temperatures, by activating a heating device which is provided at the underside of the bearing.

In this way, the lower part of the bearing housing is heated directly. A portion of the heat is transferred to the oil provided in the bearing housing, and a further portion is transferred to the air which is enclosed by the covering hood, so that the heat which is emitted by the heating device is distributed over the entire bearing housing.

A disadvantage of this known arrangement consists in that only a portion of the heat which is available for heating the bearing reaches the bearing surfaces, where it is needed, so that there is danger that the bearing surfaces are not heated sufficiently at very low outside temperatures.

The basic purpose of the invention is to produce a plastic bearing of the type mentioned above which operates satisfactorily also at extremely low temperatures and at high mechanical stress. This is achieved by arranging the heating device within the bearing.

In this way the heating energy of the device is effective directly on the plastic bearing surfaces. Particularly for this purpose it is suggested to arrange the heating device in the support ring which carries the plastic bearing surface.

A special field of use of plastic bearings exists in the aircraft construction, where they are used as bearings for the wing adjustment in aircrafts which variable wing sweepback. These bearings must be built in such a manner that they on one hand permit the wing to move in the direction of the swivel axis, and on the other hand, also permit a spherical movement of the wing relative to the point of fastening. In order to permit this movement and to avoid a clamping of the bearing surfaces, it is known to arrange a spacer between the bearing sockets and the swing-wing axis, which spacer is constructed spherically on one side and cylindrically on the other side. A plastic intermediate layer is arranged on both sides of the spacer, which plastic insert can be mounted either on the spacer itself or on the piece opposite thereto.

According to the invention the safety of operation of this bearing at low temperatures is achieved by arranging the heating device in the spacer and constructing the spacer preferably of a material having good heat conductivity. In this way, a quick and efficient heating of the plastic bearing is achieved and the disadvantage of thermal stresses occurring in the individual parts of the assembly is avoided, which stresses otherwise occur during the heating of the entire assembly according to the prior art.

The spacer can according to further characteristics of the invention be heated electrically or by a hot gas. In the case of the electrical heating, the invention suggests arranging the heating elements inside the spacer. However, they can also be arranged on the surface of the spacer, for example in grooves.

In order to conduct the heat which is produced in the heating device as much as possible entirely onto the plastic layer which must be heated, the invention provides for the arrangement of insulating layers which control the heat flow.

A further characteristic of the invention refers to inductive heating which has the advantage that the heating coils can be arranged outside of the rotating zone and that slip rings for the current supply are not needed.

The plastic bearing can, however, also be heated by means of hot engine gases. This is done according to a further suggestion by providing the spacer with longitudinal bores which are connected through radial grooves with the bore of the hollow shaft, through which the gases are supplied.

The invention is disclosed illustratively in the attached drawings, in which.

Figure 1:
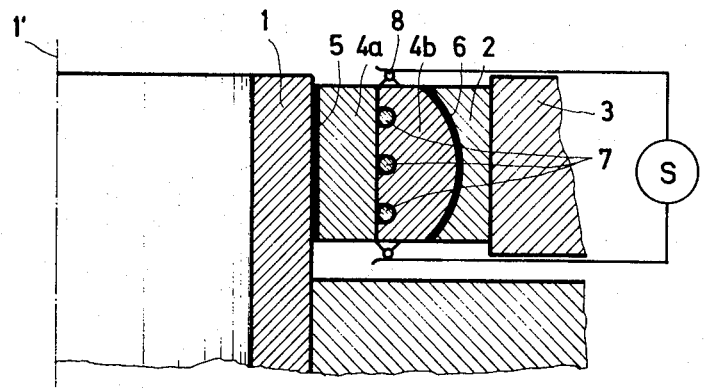
FIG. 1 is a longitudinal cross-sectional view of a plastic bearing with an electrical heating system, the heating elements of which are arranged inside of a spacer.
Figure 2:
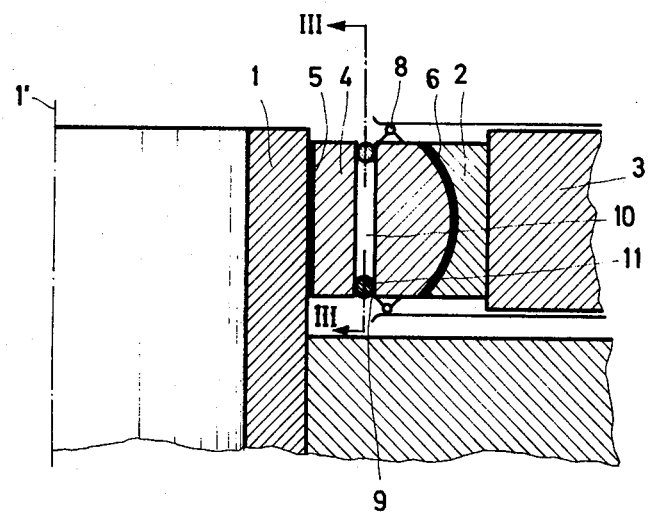
FIG. 2 is a longitudinal cross-sectional view of a plastic bearing with an electrical heating system, the heating elements of which are arranged on the surface of the spacer.

In FIGS. 1 and 2, 1 illustrates the shaft, for example of a swing-wing, which shaft is hollow. For reasons of simplification of the illustration, FIGS. 1, 2, 4 and 5 illustrate only one half of the bearing. 1' is the axis of the hollow shaft 1. 2 is the bearing socket, namely a metal part with a concave-spherical surface, which metal part is fixedly mounted to the box or frame structure of the aircraft 3. 4 in FIG. 2 illustrates a freely rotatable spacer, which, in the example of FIG. 1, consists of partial rings 4a and 4b. This ring has a hemispherical shape on its outside and is fitted to the bearing surface of the bearing socket 2. A plastic layer 5 is provided between the spacer and the shaft 1; a similar plastic layer 6 is provided between the spacer and the bearing socket 2.

In the example of FIG. 1, heating elements 7, which receive electric current through a slip ring 8, are provided within the spacer, that is between the partial rings 4a and 4b to facilitate the transfer of electrical power from an external source S to the heating element 7.

Figure 3:
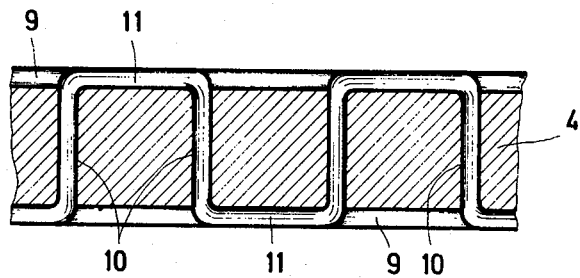
FIG. 3 is a cross-sectional view along the line III—III of FIG. 2 of a spacer rolled out on a plane.

Compared with this, in FIG. 2 the heating elements 11 are arranged on the surface of the spacer in grooves 9, which are interrupted at regular intervals by bores 10 which extend axially through the intermediate piece. The arrangement of said bores 10 and the laying of the heat conductors 11 in the bores 10 and the grooves 9 is illustrated in FIG. 3, which illustrates a cross-sectional view along line III—III of FIG. 2 and illustrates a spacer 4 rolled out onto a plane. As in the example of FIG. 1, in FIG. 2 a slip ring 8 is provided for the current supply.

Figure 4:
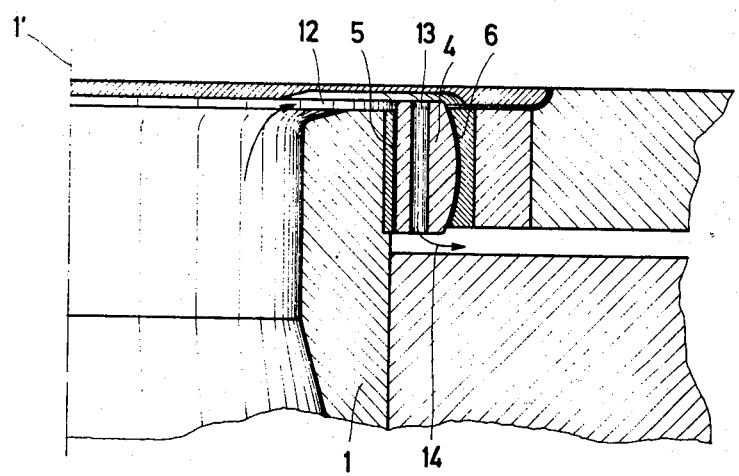
FIG. 4 is a cross-sectional view of a plastic bearing with a hot gas heating system.

FIG. 4 illustrates an embodiment of the subject matter of the invention in which the heating is effected by jets of hot gas. In this embodiment, the spacer 4 is provided with bores 13 which are connected through grooves 12 to the bore of the shaft 1.

The hot gas which comes from the engine flows through the hollow shaft 1 (see arrow) through the grooves 12 distributed over the circumference to the bores 13 of the spacer 4. Here it transfers its heat to the spacer 4 and thence to the plastic layers 5 and 6 and exits then to the outside at 14.

Figure 5:
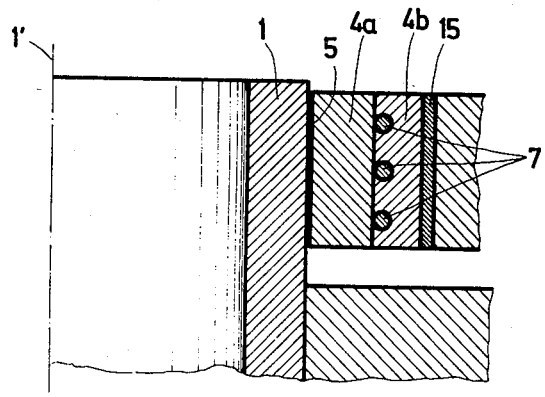
FIG. 5 is a cross-sectional view of a plastic bearing with an insulating layer for the heat flow.

FIG. 5 illustrates the construction of a plastic bearing with a heat-insulating layer which controls the heat flow. This heat-insulating layer which is identified at 15 lies close to the heating elements 7 and prevents a further conduction radially outwardly of the heat produced in said elements. Thus the heat is conducted in radial direction inwardly and heats practically without loss the plastic layer 5.

The embodiments of the invention in which an exclusive property of privilege is claimed are defined as follows:

1. In a bearing assembly particularly for rotatably supporting shaft means of a movable wing on an aircraft to effect a variation in the amount of sweepback, said bearing assembly having means defining a freely rotatable spacer positioned between said shaft means and a frame structure of said aircraft, said spacer means thereby defining a pair of radially spaced interfaces, and plastic lubricating layer means positioned between one of said pair of interfaces and in engagement with said spacer means and with one of said shaft means and said frame structure, the improvement comprising:
    means defining a passageway in said spacer means intermediate said pair of interfaces; and
    means defining a heating medium in said passageway means for effecting a uniform, homogeneous heat travel both radially inwardly and outwardly of said spacer means to heat both of said pair of interfaces and thence said plastic lubricating layer means; and
    energy supply means for supplying energy to said heating medium in said passageway means in said freely rotatable spacer means.

2. The improvement according to claim 1, wherein said heating medium means consists of wire having an electrically resistant characteristic so that the passage of electrical energy therethrough will effect a heating of same and thence said spacer means and said plastic lubricating layer means.

3. The improvement according to claim 2, wherein said energy supply means is an external electrical power source; and
    wherein said heating medium means further comprises slip ring means to facilitate the transfer of electrical power from said external electrical power source to said wire in said freely rotatable spacer means.

4. The improvement according to claim 2, wherein said passageway means comprise means defining external grooves in the axially facing sides of said spacer means and axially extending bores connecting said grooves.

5. The improvement according to claim 1, wherein said passageway means extend circumferentially of said spacer means.

6. The improvement according to claim 1, wherein said one plastic lubricating layer means is positioned at the interface between said spacer means and said shaft means; and
    including an additional one of said plastic lubricating layer means positioned at the interface between said spacer means and said frame structure.

7. The improvement according to claim 6, wherein said bearing assembly also includes means defining a bearing socket fixed to said frame structure; and
    wherein said additional one of said plastic lubricating layer means is positioned at said interface between said spacer means and said bearing socket.

8. The improvement according to claim 1, wherein said heating medium means is a hot gas flowing through said passageway means.

9. The improvement according to claim 1, including insulation layer means positioned between said frame structure and said spacer means.

10. The improvement according to claim 1, wherein said spacer means is made of a heat conductive material.

11. The improvement according to claim 1, wherein said spacer means comprises a cylindrical inner ring and an outer ring mounted on said inner ring, said outer ring having a hemispherically shaped outer interface, said plastic lubricating layer means being composed of two separate layers, one being mounted on the radially innermost interface of said inner ring, the other on said hemispherically shaped interface.

* * * * *